(12) United States Patent
Saragadam (10) Patent No.: US 10,248,160 B1
(45) Date of Patent: Apr. 2, 2019

(54) MONITOR WITH INTEGRATED KEYBOARD STORAGE

(71) Applicant: Dell Products L. P., Round Rock, TX (US)

(72) Inventor: Rajesh Saragadam, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/965,037

(22) Filed: Apr. 27, 2018

(51) Int. Cl.
*G06F 1/16* (2006.01)
*H05K 5/00* (2006.01)
*H05K 7/00* (2006.01)

(52) U.S. Cl.
CPC .... *G06F 1/1607* (2013.01); *G06F 2200/1612* (2013.01); *G06F 2200/1613* (2013.01)

(58) Field of Classification Search
CPC .... G06F 1/1607; G06F 1/1601; G06F 1/1603; G06F 1/1605; G06F 1/1609; G06F 1/1611
USPC ............ 361/679.08, 679.17, 679.18, 679.01, 361/679.02, 679.21, 679.22, 679.23, 361/679.24, 679.25
See application file for complete search history.

(56) References Cited

U.S. PATENT DOCUMENTS

| | | | | |
|---|---|---|---|---|
| 4,704,604 A * | 11/1987 | Fuhs | ...................... | G06F 3/0202 16/254 |
| 6,549,189 B1 * | 4/2003 | Zarek | ...................... | G06F 3/0213 345/167 |
| 7,032,043 B1 * | 4/2006 | Kashiwagi | ................. | G06F 1/18 361/600 |
| 7,362,310 B2 * | 4/2008 | Wilk | .......................... | G06F 1/16 345/156 |
| 8,092,106 B2 * | 1/2012 | Hu | .......................... | G06F 1/1607 248/305 |
| 9,134,758 B2 * | 9/2015 | Chen | ...................... | G06F 1/1616 |
| 2007/0229728 A1 * | 10/2007 | Chang | ................ | G02F 1/133308 349/60 |
| 2013/0148282 A1 * | 6/2013 | Chen | ...................... | G06F 1/1601 361/679.08 |
| 2015/0036273 A1 * | 2/2015 | Hui | ......................... | G06F 1/1654 361/679.08 |

* cited by examiner

*Primary Examiner* — Anthony M Haughton
(74) *Attorney, Agent, or Firm* — Campbell Stephenson LLP; Shiv S. Naimpally (57) ABSTRACT

In some examples, a display device may include a display surface having a rectangular shape and a bezel surrounding the display surface. The bezel may include a release mechanism linked to two L-shaped arms that are stored retracted into the bottom of the display device. When retracted, the L-shaped arms may not be externally visible. When selected, the release mechanism may cause the L-shaped arms to be released from the bottom of the display device. The L-shaped arms may each be positioned to hold (e.g., store) a keyboard. A length of each of the L-shaped arms may be independently adjustable. In some cases, a back of the keyboard may include a U-shaped ridge to couple with a U-shaped groove on a mouse to temporarily store the mouse on the back of the keyboard when the keyboard is stored in the L-shaped arms.

20 Claims, 8 Drawing Sheets

MONITOR WITH INTEGRATED KEYBOARD STORAGE

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A display device, also referred to as a monitor, may be connected to (and in some cases, integrated with) a computing device. In this way, the display device may be part of an IHS. As the amount of workspace (e.g., desktop surface area) provided by companies to employees, particular technology workers, continue to shrink, employees may have difficulties finding sufficient desktop surface area to perform non-computing related work. For example, an employee may gather up paperwork and head to an empty meeting room or to an empty table in the company's cafeteria to find sufficient space to work.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a display device may include a display surface having a rectangular shape and a bezel surrounding the display surface. The bezel may include a release mechanism. Two L-shaped arms be stored in a retracted position in a bottom of the display device. When retracted, the L-shaped arms may not be externally visible. When selected (e.g., pressed), the release mechanism may cause the L-shaped arms to be released from the bottom of the display device. The L-shaped arms may be positioned to enable a keyboard to be held (e.g., stored) by the arms. A length of each of the L-shaped arms may be independently adjustable. For example, the L-shaped arms may each include a telescoping mechanism to adjust the length of each of the L-shaped arms. In some cases, a back of the keyboard may include a U-shaped ridge to couple with a U-shaped groove on a mouse to enable the mouse to be temporarily stored on the back of the keyboard when the keyboard is stored in the first L-shaped arm and the second L-shaped arm.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein incorporate two arms into a bezel of a display device ("display monitor"). When a user is working on the computer, such as by typing on a keyboard connected to the computer, the two arms may be recessed (e.g., stored) inside the bottom of the bezel. When the user desires more workspace, the user may pull the arms out from the bezel and position them to hold the keyboard. For example, an L-shaped bracket may be located at one end of the arm while the other end of the arm may be attached to a cylindrical shaft that enables the arm to be rotated when positioning the arm. When not in use, each arm may be rotated towards the bezel and then retracted into the bezel to store each arm. When each arm is stored in the bezel, the monitor may outwardly appear like any other monitor, e.g., the presence of the arms may not be visible to enable the monitor to appear aesthetically pleasing.

In some cases, (e.g., if the distance between the display surface of the display device and the bezel is less than a predetermined amount, such as 1 millimeter (mm)), the bezel may include two bumps on either side to prevent the keyboard from touching the display surface. Each bump may protrude several millimeters from the surface of the bezel to keep an edge of the keyboard at least a predetermined distance from the display surface. Each bump may be a portion of a geometric shape, such as, for example, a sphere, a rectangular box, a triangle, or the like. In some cases, each bump may be recessed into (e.g., flush with the surface of) the bezel and when the arms are being used to hold the keyboard, each bump may protrude from the surface of the bezel to keep an edge of the keyboard at least a predetermined distance from the display surface.

For example, a display device may include a display surface having a rectangular shape and a bezel surrounding the display surface. The bezel may include a release mechanism. When selected (e.g., pressed), the release mechanism may cause a first L-shaped and a second L-shaped arm to be released from a bottom of the display device. The first L-shaped arm may be positioned in a first position and the second L-shaped arm may be positioned in a second position to enable a keyboard to be held (e.g., stored) by the arms. In some cases, a first bump may be located on a left vertical member of the bezel and a second bump may be located on a right vertical member of the bezel. The first and second bump may either be fixed or retractable. If the first and second bump are retractable, then before the selection of the release mechanism, a top most surface of each of the first bump and the second bump may be approximately flush with an outer surface of the bezel. After the selection of the release mechanism, the top most surface of each of the first bump and the second bump may protrude from the outer surface of the bezel by a predetermined distance (e.g., 1 mm to 1 cm). If the first and second bump are not retractable, the first and second bump may be fixed to the bezel and may protrude the predetermined distance. When protruding, the first bump and the second bump may keep one edge of the keyboard (e.g., the upper edge of the keyboard when the keyboard is placed in the arms) a predetermined distance from the display surface, thereby preventing the edge of the keyboard from touching, scratching, or otherwise damaging the display surface. Each of the first bump and the second bump may include a portion of a geometric shape, such as, for example, a sphere, a rectangle, or a pyramid. A length of the first L-shaped arm may be adjustable (e.g., between about 2 cm to about 18 cm) and a length of the second L-shaped arm may be adjustable independent of the length of the first L-shaped arm. For example, the first L-shaped arm and the second L-shaped arm may each include a telescoping mechanism to adjust the length of the first L-shaped arm independently of the length of the second L-shaped arm. In some cases, a back of the keyboard may include a U-shaped ridge to couple with a U-shaped groove on a mouse to enable the mouse to be temporarily stored on the back of the keyboard when the keyboard is stored in the first L-shaped arm and the second L-shaped arm. In some cases, the display device may be an all-in-one computer that includes a motherboard with one or more processors and one or more non-transitory computer-readable storage media storing instructions that are executable by the one or more processors.

Figure 1A:
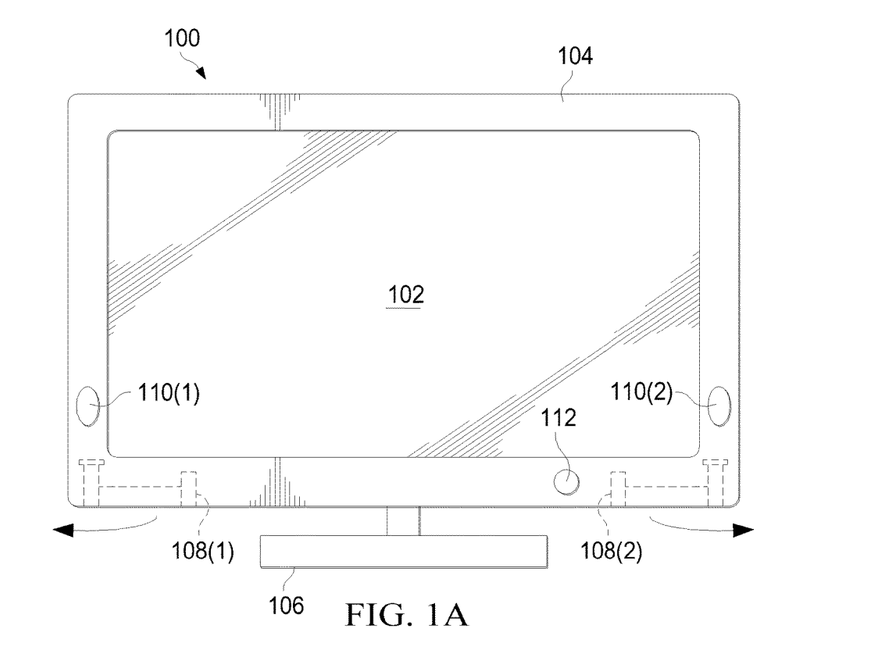
FIG. 1A and 1B illustrate a display device with integrated arms according to some implementations.
Figure 1B:
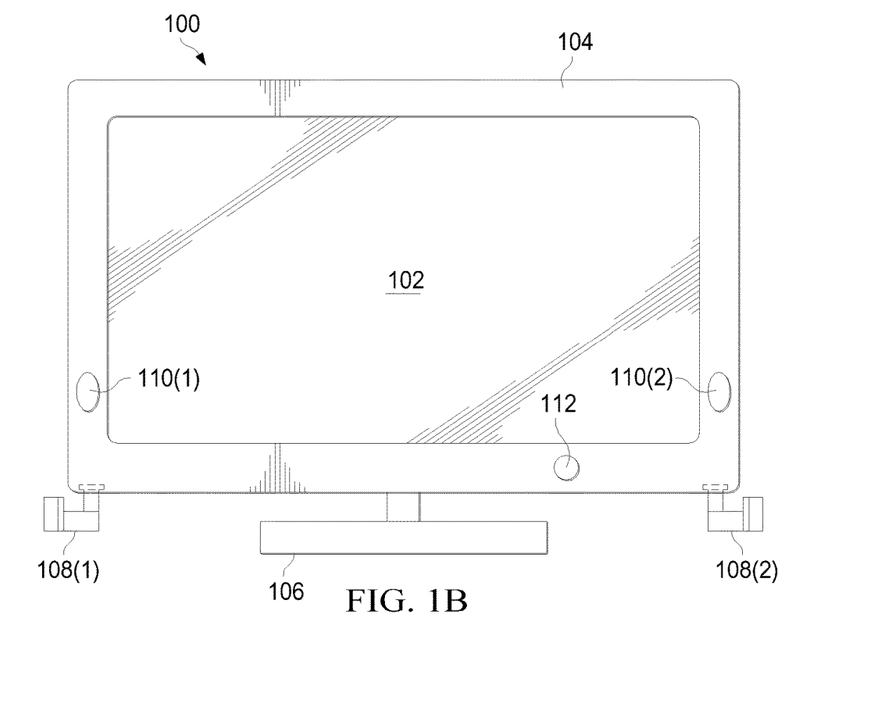

FIG. 1A and 1B illustrate a display device 100 with integrated arms according to some implementations. The display device 100 may include a display surface 102 that is framed by a bezel 104. A base 106 may be attached to an external housing of the display device 100. The base 106 may be used to place the display surface 102 at a particular height relative to the user.

The bezel 104 may be used to house (e.g., store) arms 108(1) and 108(2). When the arms 108 are retracted for storage in a bottom of the display device 100 (as illustrated in FIG. 1A), the arms 108 may not be externally visible. In some cases, a user may manually pull (e.g., extract) the arms 108 from the bezel 104 and position the arms 108. In other cases, a user may press (e.g., select) a release mechanism 112 to cause the arms 108 to drop down from the bezel 104. The arms 108 may be a fixed length (e.g., between about 1 cm to about 18 cm) or the arms 108 may employ a telescopic or other mechanism to enable the length of each of the arms 108 to be individually adjusted (e.g., lengthened or shortened) to a particular length, between about 1 cm to about 18 cm. FIG. 1A illustrates the arms 108 retracted into the bottom of the display device 100 and FIG. 1B illustrates the arms 108 released from bottom of the display device 100.

In some cases, bumps 110(1) and 110(2) may be positioned on the bezel 104 to prevent an edge of a keyboard from touching the display surface 102 by keeping the edge at least a predetermined distance from the display surface 102. The bumps 110 may be fixed or may pop-out from the bezel 104 after the release mechanism 112 is selected. Each of the bumps 110 may be a portion of a geometric shape, such as, for example, a sphere, a rectangular box, a triangle, or the like. In the case where the bumps 110 pop-out, the bumps 110 may be recessed into (e.g., flush with the surface of) the bezel 104. After the release mechanism 112 is pressed, the bumps 110 may protrude from the surface of the bezel 104 to keep an edge of the keyboard at least a predetermined distance from the display surface 102. The distance from the bump 110(1) to the arm 108(1) and the distance from the bump 110(2) to the arm 108(2) may be several centimeters (cm), such as, for example, between about 2 to 8 cm. Each of the bumps 110, either when integrated into the bezel 104 or when extended from the bezel 104, may protrude from the surface of the bezel 104 a distance of between about 1 mm to about 1 cm.

In some cases, the display device 100 may be a self-contained (e.g., all-in-one) computing device. For example, a computer motherboard that includes a CPU, memory, and associated components may be located behind the display surface 102 of the display device 100.

Figure 2A:
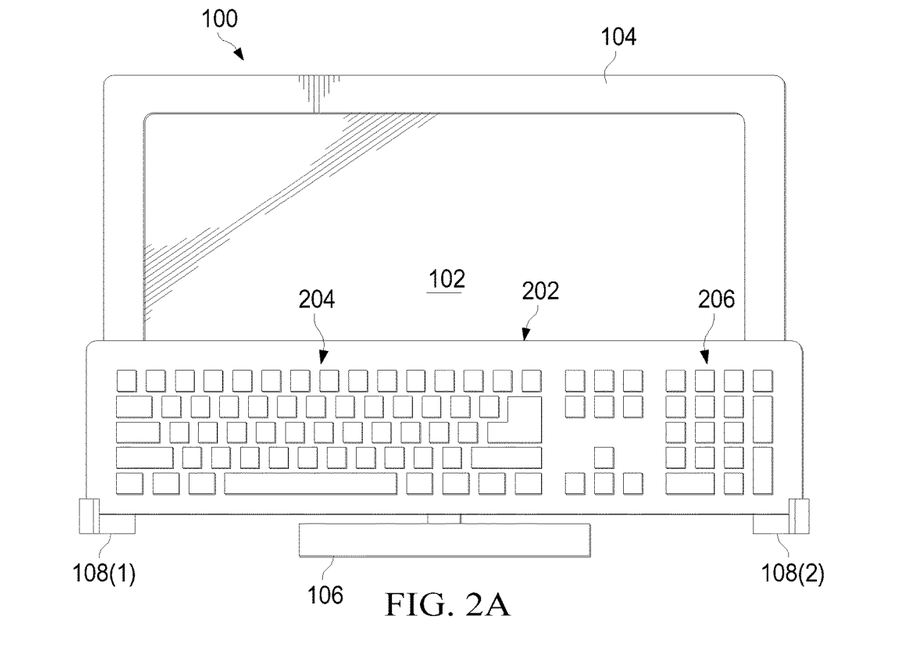
FIG. 2A and 2B illustrate a display device with integrated arms to store a keyboard according to some implementations.
Figure 2B:
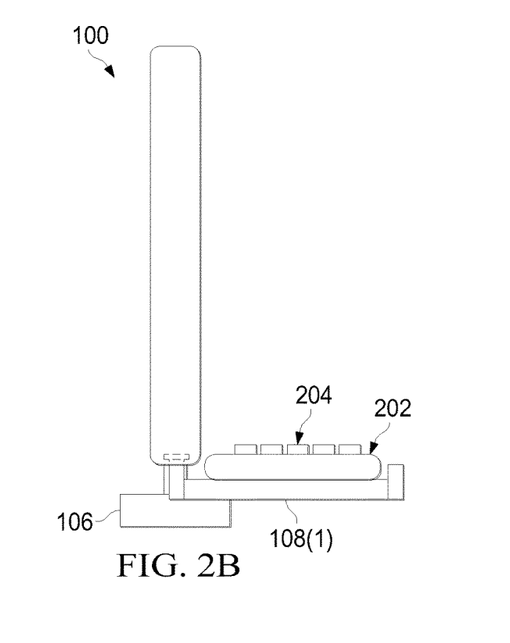

FIG. 2A and 2B illustrate a display device with integrated arms to store a keyboard according to some implementations. FIG. 2A provides a front view illustrating positioning the arms 108 of the display device 100 approximately perpendicular to the bezel 104 and placing a keyboard inside the arms 108. The keyboard 202 may include multiple keys 204 (e.g., a QWERTY-based keyboard) and a keypad 206 (e.g., numeric keypad). In this way, the keyboard 202 can be removed from the surface of a desktop to provide a user with additional workspace.

FIG. 2B provides a side view illustrating positioning the arms 108 of the display device 100 approximately perpendicular to the bezel 104 and placing a keyboard inside the arms 108. In some cases, the arms 108 may be relatively long (e.g., between about 12 to 18 cm in length) such that when the keyboard 202 is placed in the arms 108, the keyboard 108 may be approximately parallel to a desktop surface. The arms 108 may be of a fixed length or the arms 108 may telescope such that the user can adjust the length of each of the arms 108 to enable the entire width of the keyboard 202 to be accommodated, as illustrated in FIG. 2B. In other cases, the arms 108 may be relatively short (e.g., between about 1 cm to 4 cm in length) such that when the keyboard 108 is placed in the arms, the keyboard 108 may lean back to touch the bezel 104, as illustrated in FIG. 2A, FIG. 3A, and FIG. 3B.

Figure 3A:
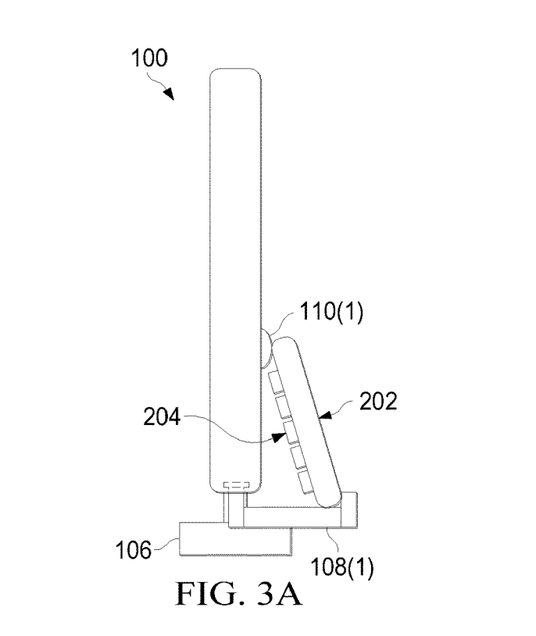
FIG. 3A and 3B illustrate a display device having two protrusions to protect a screen of the display device according to some implementations.
Figure 3B:
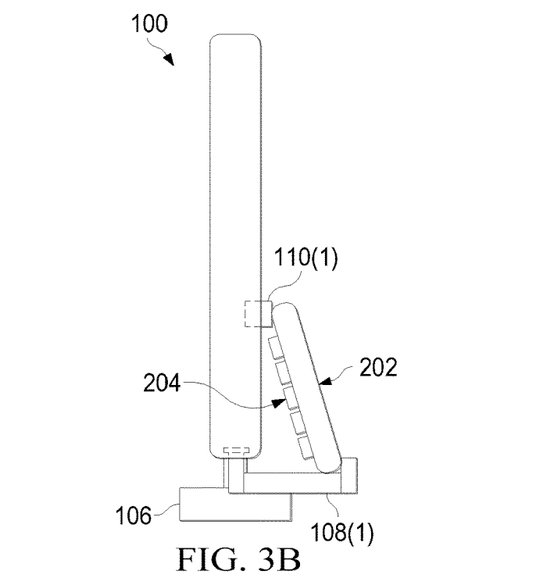

FIG. 3A and 3B illustrate a display device having two protrusions to protect a screen of the display device according to some implementations. FIG. 3A and 3B both illustrate a side view of FIG. 2A and 2B, respectively, e.g., a side view of the keyboard 202 being held up, above a desktop surface, by the arms 108. FIG. 3A and 3B illustrates how the bumps 110 may hold an edge of the keyboard 202 a predetermined distance from the display surface 102 of the display device 100.

The bumps 110 may be a geometric shape or a portion of a geometric shape, such as, for example, a sphere, a rectangle, a pyramid, or another geometric shape. For example, FIG. 3A shows a side view of semi-spherical shaped bumps 110. The semi-spherical shaped bumps 110 may be built-in to the bezel 104 of the display device 100. The bumps 110 may protrude a relatively short distance, such as, for example, between about 1 mm to about 6 mm from the bezel of the display device 100, thereby preventing the top edge of the keyboard 202 from touching the display surface of the display device 100.

FIG. 3B shows a side view of rectangular bumps 110. The rectangular bumps 110 may be recessed into the bezel 104 such that when the rectangular bumps 110 are not being used (e.g., the keyboard 202 is not in the arms 108), the top surface of the rectangular bumps 110 may be approximately flush with the external surface of the bezel 104, thereby providing a pleasant visual experience similar to a display device 100 that does not have the bumps 110. In some cases, the user may manually pull the rectangular-shaped bumps 110 out from the bezel 104 before the user places the keyboard 202 into the arms 108. In other cases, the rectangular-shaped bumps 110 may automatically protrude out from the bezel 104 in response to the user pressing the release 112. For example, pressing the release 112 may cause the arms to be released from the bezel 104 and cause the rectangular-shaped bumps 110 to automatically protrude out from the bezel 104. To illustrate, a spring-loaded mechanism may be located behind the bumps 110. When the user presses the release 112, the spring-loaded mechanism may be released, causing the spring to push the rectangular-shaped bumps 110 to protrude out from the bezel 104. When the user desires to use the keyboard, the user may press each of the bumps 110 back into the bezel 104, causing the spring to be tensioned, while a locking mechanism (that can be released by the release 112) holds the tensioned spring and holds the top of the bumps 110 approximately flush with the surface of the bezel 104.

When the keyboard 202 is placed in the arms 108 as illustrated in FIG. 3A and 3B, the keyboard 202 may form an approximate hypotenuse of a triangle that includes the display device 100 on one side of the triangle and the arms 108 on another side of the triangle.

Figure 4:
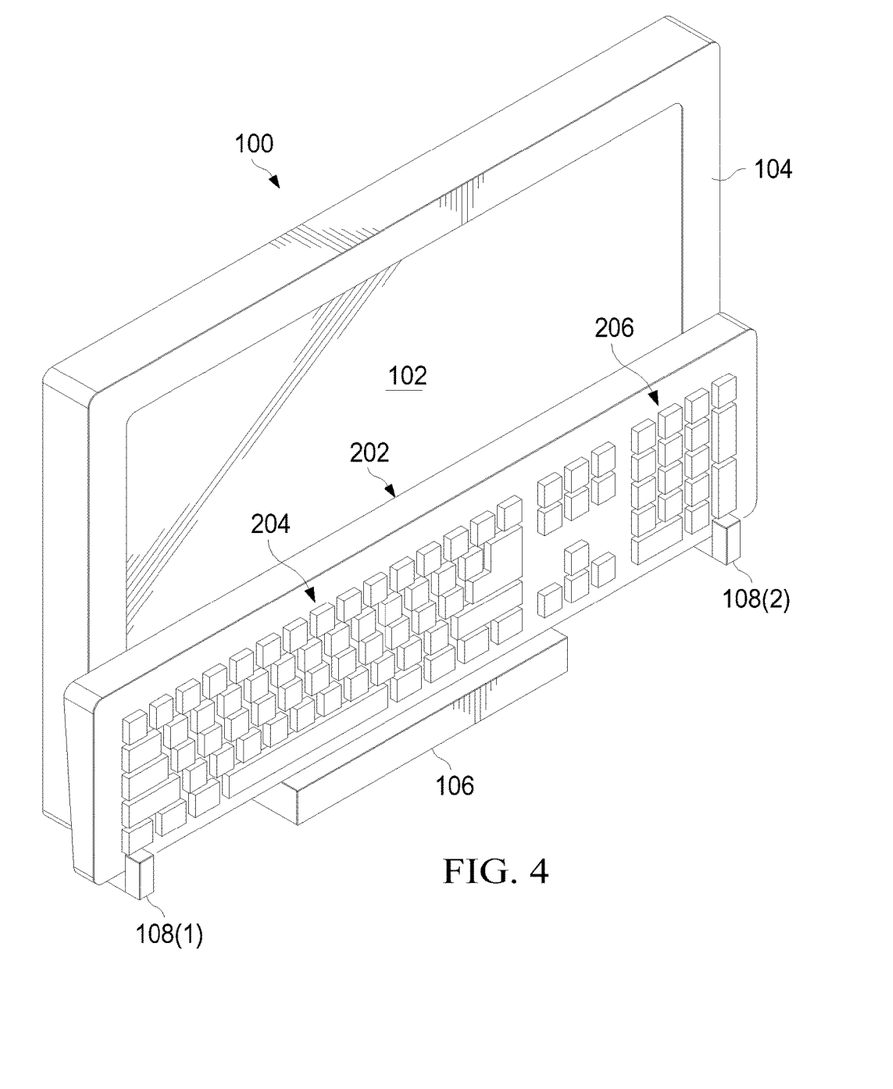
FIG. 4 illustrate a display device with integrated arms storing a keyboard according to some implementations.

FIG. 4 illustrates a display device with integrated arms storing a keyboard according to some implementations. FIG. 4 provides a perspective view of how the keyboard 202 may appear when placed in the arms 108 that extend from the bottom of the bezel 104 of the display device 100. Thus, the arms 108 may enable the user to place the keyboard 202 in the arms 108, thereby creating additional workspace for situations when the user is not using the display device 100.

Figure 5A:
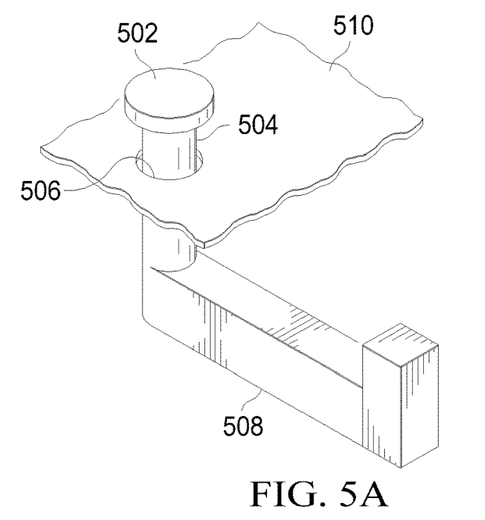
FIG. 5A and 5B illustrate components of an arm according to some implementations.
Figure 5B:
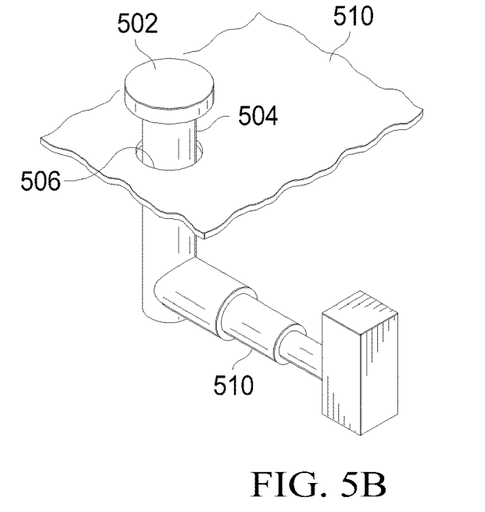

FIG. 5A and 5B illustrate components of an arm according to some implementations. Each of the arms 108 may include a head 502 attached to cylindrical shaft 504. For ease of understanding, the head 502 is shown as separate from a bottom surface 510 of the display device 100 of FIG. 1. However, in some cases, the head 502 may be attached or affixed to the bottom surface 510. The shaft 504 may be attached to the head 502 in such a way that the shaft 504 can rotate 180 degrees within a hole 506 in the bottom surface 510.

As illustrated in FIG. 5A, an L-shaped bracket 508 may be attached to the shaft 504. The bottom of the L-shaped bracket 508 may protrude up from about 2 mm to 1 cm or more to hold a keyboard in place.

As illustrated in FIG. 5B, the L-shaped bracket 508 may include a telescoping arm 510. The length of the telescoping arm 510 may be adjustable in length, for example, from about 2 mm to 1 cm (or more). To illustrate, the user may keep the telescoping arm 510 relatively short when placing the keyboard 202 of FIG. 2 in the arms 108 such that a top edge of the keyboard 202 is resting on the bumps 110, as illustrated in FIG. 3A and 3B. As another example, the user may extend the telescoping arm 510 to relatively long length when placing the keyboard 202 of FIG. 2 in the arms 108 such that the keyboard 202 is approximately parallel to the base 106 (and a desktop surface), as illustrated in FIG. 2B.

Figure 6A:
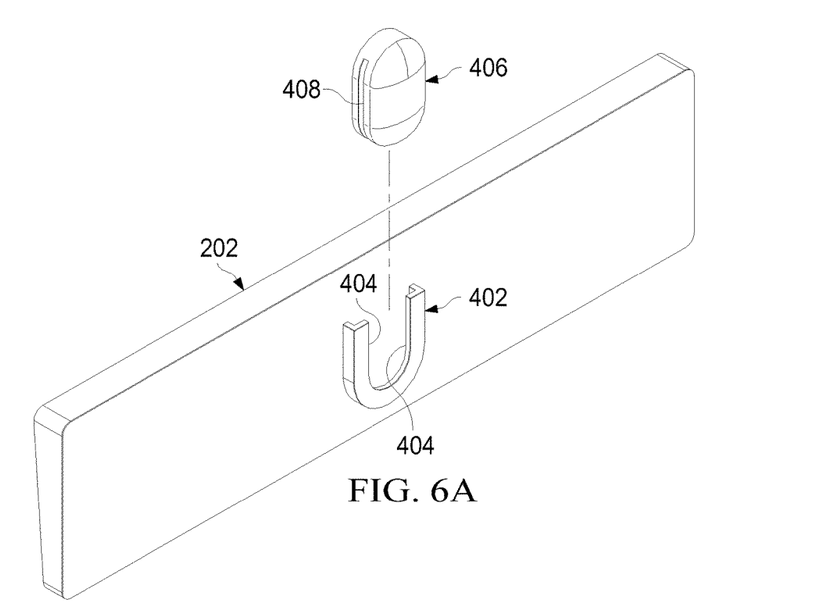
FIG. 6A and 6B illustrate a keyboard with a mouse holder on the bottom of the keyboard according to some implementations.
Figure 6B:
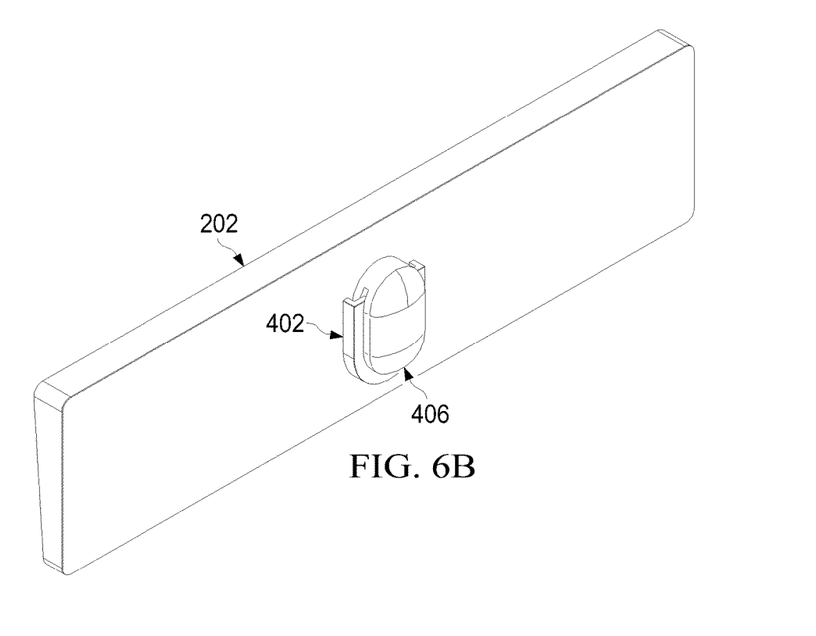

FIG. 6A and 6B illustrate a keyboard with a mouse holder on the bottom of the keyboard according to some implementations. In some cases, the bottom (e.g., non-key side) of the keyboard 202 may include a mouse holder 402. The mouse holder 402 may include a U-shaped raised ridge 404. A mouse 406 may have a U-shaped groove 408 along the external surface (e.g., circumference) of the mouse 404.

To place the mouse 406 on the back of the keyboard 202, a user may hold the mouse 406 above the ridge 404, line up the groove 408 in the mouse 406 with the U-shaped ridge 404 of the mouse holder 402, and slide the mouse 406 down. The bottom of the "U" faces down, thereby holding the mouse 406 in place. To remove the mouse 406 from the back of the keyboard 202, the user may lift the mouse 406 from the U-shaped ridge 404 of the mouse holder 402 by sliding the mouse 406 up and off the ridges 404. FIG. 6A illustrates the mouse 406 before being placed in the mouse holder 402 and after the mouse 406 has been removed from the mouse holder 402. FIG. 6B illustrates the mouse 406 after the mouse 402 has been placed in the mouse holder 402

Figure 7A:
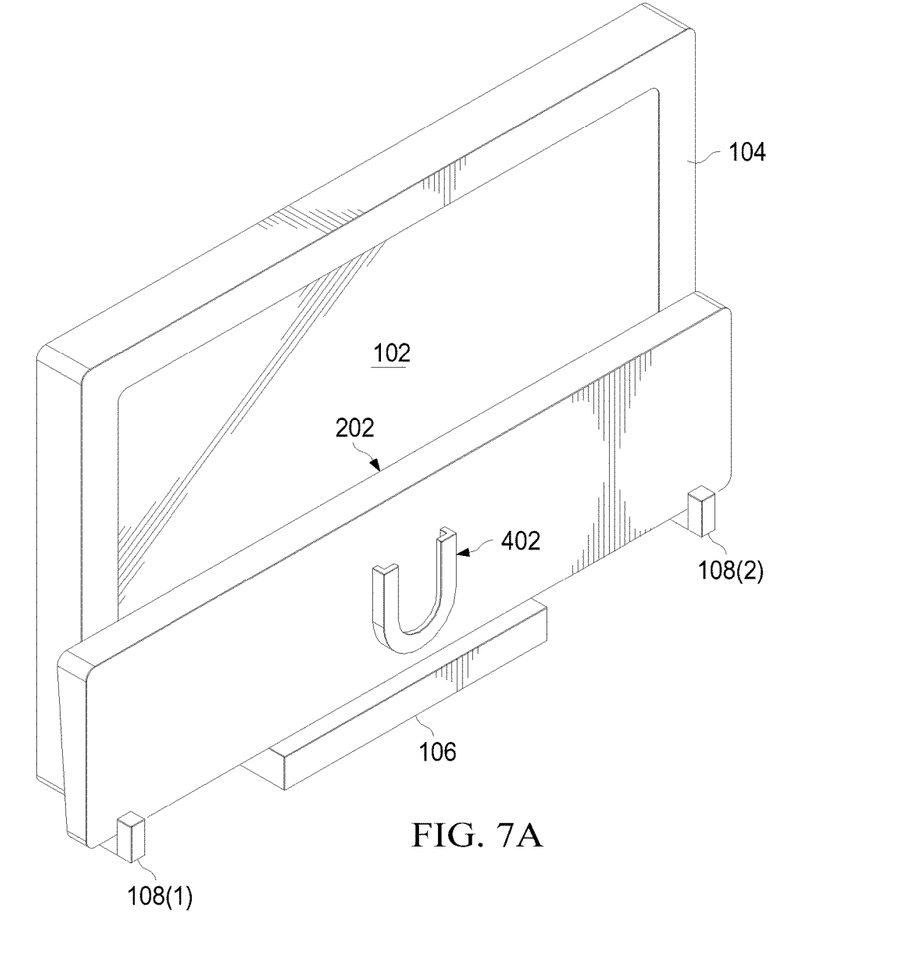
FIG. 7A and 7B illustrate attaching a mouse to a back of a keyboard according to some implementations.
Figures 7B, 8:
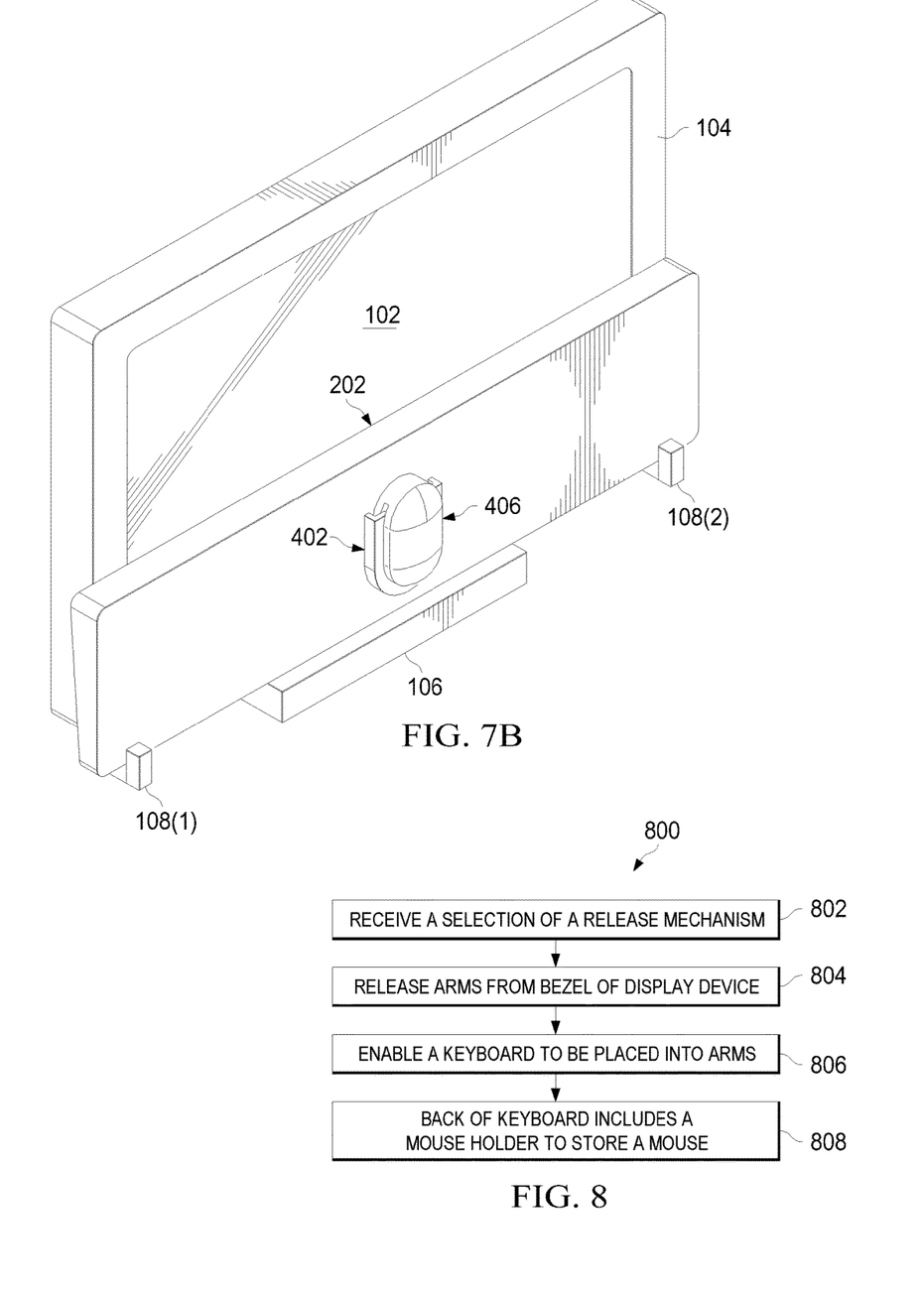
FIG. 8 is a flowchart of a process that includes lowering arms from a bezel of a display device according to some implementations.

FIG. 7A and 7B illustrate attaching a mouse to a back of a keyboard according to some implementations. FIG. 7A illustrates the mouse holder 402 on the back of the keyboard 202. FIG. 7B illustrates how the mouse 402 may be temporarily stored on the back of the keyboard 202. In this way, a user is able to temporarily take the keyboard 202 and the mouse 406 off of a desktop surface to increase the amount of workspace available to the user. In addition, by storing the keyboard 202 and the mouse 406 using the arms 108 of the display device 100 (e.g., as in FIG. 7B), the keyboard 202 and the mouse 406 may remain close to the display device 100, preventing the keyboard 202 and the mouse 406 from getting misplaced (e.g., lost) or damaged.

In the flow diagram of FIG. 8, each block represents one or more operations. The order in which the blocks are described is not intended to be construed as a limitation, and any number of the described operations can be combined in any order and/or in parallel to implement the process. For discussion purposes, the process 800 is described with reference to FIGS. 1, 2, 3, 4, 5, 6, and 7 as described above, although other models, frameworks, systems and environments may implement these processes.

FIG. 8 is a flowchart of a process 800 that includes providing a solution package according to some implementations.

At 802, a display device may determine that a user has selected a release mechanism. At 804, in response to receiving a selection of the release mechanism, the release mechanism in the display device may release two arms from a bottom of the bezel of the display device. For example, in FIG. 1, the display device 100 may determine that a user selected the release mechanism 112. In response, the release mechanism 112 may cause the arms 108 to drop down from the bottom of the display device 100.

At 806, a user may position the arms to enable a keyboard to be placed into and held up by the arms. For example, in FIG. 2, a user may position the arms 108 approximately perpendicular to the display device 100 and place the keyboard 202 in the arms 108. In this way, the user may free up space on a workspace, such as top of a desk.

At 808, the back of the keyboard may include a mouse holder to hold a mouse. By placing a mouse into the mouse holder, the user can remove both the keyboard and the mouse from the top of a desk, freeing up a significant amount of workspace.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A display device comprising:
a display surface having a rectangular shape;
a bezel surrounding the display surface;
a first L-shaped arm;
a second L-shaped arm;
at least one cavity into which the first L-shaped arm and the second L-shaped arm are stored in a retracted position, the first L-shaped arm and the second L-shaped arm approximately flush with a bottom surface of the display device in the retracted position;
a first bump and a second bump located in the bezel, wherein a top most surface of each of the first bump and the second bump is approximately flush with an outer surface of the bezel; and
a release mechanism;
wherein:
selection of the release mechanism causes:
the first L-shaped arm and the second L-shaped arm to be released from the at least one cavity of the display device;
the first bump and the second bump to each protrude between about two centimeters to about eight centimeters from the bezel;
positioning the first L-shaped arm in a first position and positioning the second L-shaped arm in a second position enables a keyboard to be placed in the first L-shaped arm and the second L-shaped arm; and
the first L-shaped arm and the second L-shaped arm each include a telescoping mechanism that enables the first L-shaped arm and the second L-shaped arm to be extended, approximately perpendicular to the display surface, from between one centimeter to less than eighteen centimeters.

2. The display device of claim 1, wherein:
the first bump is located on a left vertical member of the bezel; and
the second bump is located on a right vertical member of the bezel;
wherein the first bump and the second bump position an upward facing edge of the keyboard a predetermined distance from the display surface.

3. The display device of claim 1, wherein each of the first bump and the second bump comprises a portion of one of a sphere, a cube, or a pyramid.

4. The display device of claim 1, wherein:
a first lip is located at a first end of the first L-shaped arm; and
a second lip is located at a second end of the second L-shaped arm.

5. The display device of claim 1, wherein:
a first length of the first L-shaped arm is adjustable using the telescoping mechanism; and
a second length of the second L-shaped arm is adjustable independent of the first length of the first L-shaped arm.

6. The display device of claim 1, wherein:
a back of the keyboard includes a U-shaped ridge such that when the keyboard is placed in the first and second L-shaped arms, a bottom portion of the U-shaped ridge is facing towards a base of the display device and a top portion of the U-shaped ridge is facing towards a top of the display device; and the U-shaped ridge is capable of coupling with a U-shaped groove on a mouse to enable the mouse to be held on the back of the keyboard.

7. A computing device comprising:
a display surface having a rectangular shape;
a bezel surrounding the display surface;
a first L-shaped arm;
a second L-shaped arm;
at least one cavity into which the first L-shaped arm and the second L-shaped arm are stored in a retracted position, the first L-shaped arm and the second L-shaped arm approximately flush with a bottom surface of the computing device in the retracted position;
a first bump and a second bump located in the bezel, wherein a top most surface of each of the first bump and the second bump is approximately flush with an outer surface of the bezel; and
a release mechanism;
wherein:
selection of the release mechanism causes:
the first L-shaped arm and the second L-shaped arm to be released from the at least one cavity of the computing device;
the first bump and the second bump to each protrude between about two centimeters to about eight centimeters from the bezel;
positioning the first L-shaped arm in a first position and positioning the second L-shaped arm in a second position enables a keyboard to be placed in the first L-shaped arm and the second L-shaped arm; and
the first L-shaped arm and the second L-shaped arm each include a telescoping mechanism that enables the first L-shaped arm and the second L-shaped arm to be extended, approximately perpendicular to the display surface, from between one centimeter to less than eighteen centimeters.

8. The computing device of claim 7, wherein:
the first bump is located on a left side of the bezel; and
the second bump is located on a right side of the bezel;
wherein the first bump and the second bump hold an upward facing edge of the keyboard a predetermined distance from the display surface.

9. The computing device of claim 8, wherein the first bump and the second bump each comprise at least a portion of one of a sphere, a cube, or a pyramid.

10. The computing device of claim 8, wherein:
a first lip is located at a first end of the first L-shaped arm; and
a second lip is located at a second end of the second L-shaped arm.

11. The computing device of claim 7, wherein:
a first length of the first L-shaped arm is adjustable using the telescoping mechanism; and
a second length of the second L-shaped arm is adjustable independent of the first length of the first L-shaped arm.

12. The computing device of claim 7, further comprising:
a motherboard comprising one or more processors and one or more memory devices, the motherboard located behind the display surface.

13. The computing device of claim 7, wherein:
a back of the keyboard includes a U-shaped ridge to couple with a U-shaped groove on a mouse to hold the mouse on the back of the keyboard.

14. A computing device comprising:
a motherboard comprising:
one or more processors; and
one or more non-transitory computer-readable storage media storing instructions that are executable by the one or more processors;
a display device comprising:
a display surface having a rectangular shape;
a bezel surrounding the display surface;
a first L-shaped arm;
a second L-shaped arm;
at least one cavity into which the first L-shaped arm and the second L-shaped arm are stored in a retracted position, the first L-shaped arm and the second L-shaped arm approximately flush with a bottom surface of the display device in the retracted position;
a first bump and a second bump located in the bezel, wherein a top most surface of each of the first bump and the second bump is approximately flush with an outer surface of the bezel;
a release mechanism;
wherein:
selection of the release mechanism causes:
the first L-shaped arm and the second L-shaped arm to be released from the at least one cavity of the display device;
the first bump and the second bump to each protrude between about two centimeters to about eight centimeters from the bezel;
positioning the first L-shaped arm in a first position and positioning the second L-shaped arm in a second position enables a keyboard to be held by the first L-shaped arm and the second L-shaped arm; and
the first L-shaped arm and the second L-shaped arm each include a telescoping mechanism that enables the first L-shaped arm and the second L-shaped arm to be extended, approximately perpendicular to the display surface, from between one centimeter to less than eighteen centimeters.

15. The computing device of claim 14, wherein:
the first bump is located on a left vertical member of the bezel; and
the second bump is located on a right vertical member of the bezel;
wherein the first bump and the second bump position one edge of the keyboard a predetermined distance from the display surface.

16. The computing device of claim 15, wherein each of the first bump and the second bump comprises a portion of one of a sphere, a sphere, or a pyramid.

17. The computing device of claim 15, wherein:
a first lip is located at a first end of the first L-shaped arm; and
a second lip is located at a second end of the second L-shaped arm.

18. The computing device of claim 14, wherein:
a first length of the first L-shaped arm is adjustable using the telescoping mechanism; and
a second length of the second L-shaped arm is adjustable independent of the first length of the first L-shaped arm.

19. The computing device of claim 14, wherein:
the computing device comprises an all-in-one computing device.

20. The computing device of claim 14, wherein:
a back of the keyboard includes a U-shaped ridge to couple with a U-shaped groove on a mouse to enable the mouse to be temporarily stored on the back of the keyboard when the keyboard is stored in the first L-shaped arm and the second L-shaped arm.

\* \* \* \* \*